United States Patent
Heo

(10) Patent No.: US 9,436,317 B2
(45) Date of Patent: Sep. 6, 2016

(54) TOUCH SENSOR AND TOUCH SENSITIVE DISPLAY INCLUDING THE SAME

(71) Applicant: Dongbu Hitek Co., Ltd., Gyeonggi-do (KR)

(72) Inventor: Woon Hyung Heo, Chungcheongnam-do (KR)

(73) Assignee: Dongbu Hitek Co., Ltd., Gyeonggi-do (KR)

( * ) Notice: Subject to any disclaimer, the term of this patent is extended or adjusted under 35 U.S.C. 154(b) by 123 days.

(21) Appl. No.: 14/281,078

(22) Filed: May 19, 2014

(65) Prior Publication Data

US 2015/0248188 A1    Sep. 3, 2015

(30) Foreign Application Priority Data

Mar. 3, 2014    (KR) .................... 10-2014-0025225

(51) Int. Cl.
*G06F 3/041* (2006.01)
*G06F 3/044* (2006.01)

(52) U.S. Cl.
CPC ............. *G06F 3/0418* (2013.01); *G06F 3/044* (2013.01)

(58) Field of Classification Search
CPC .............................. G06F 3/0418; G06F 3/044
USPC ......................................................... 345/174
See application file for complete search history.

(56) References Cited

U.S. PATENT DOCUMENTS

| | | | |
|---|---|---|---|
| 2010/0182307 A1* | 7/2010 | Chang ................. | G09G 3/3688 345/214 |
| 2011/0193817 A1* | 8/2011 | Byun .................... | G06F 3/0418 345/174 |
| 2012/0268144 A1 | 10/2012 | Ahn et al. | |
| 2013/0063396 A1* | 3/2013 | Kim ...................... | G06F 3/0418 345/174 |
| 2015/0130755 A1* | 5/2015 | Jain ....................... | G06F 3/0416 345/174 |
| 2015/0268760 A1 | 9/2015 | Park | |

FOREIGN PATENT DOCUMENTS

| | | |
|---|---|---|
| JP | 2011-165184 A | 8/2011 |
| KR | 2012-0083145 A | 7/2012 |
| KR | 2012-0119419 A | 10/2012 |

OTHER PUBLICATIONS

Notice of Allowance for Korean Application No. 10-2014-0025225 dated Jun. 29, 2015.

\* cited by examiner

*Primary Examiner* — Chanh Nguyen
*Assistant Examiner* — Daniel Duong
(74) *Attorney, Agent, or Firm* — Patterson Thuente Pedersen, P.A.

(57) ABSTRACT

A touch sensor includes a touch panel, a driver for supplying a driving signal to each of driving lines of the touch panel, and a sensor electrically connected to sensing lines of the touch panel, for detecting capacitance of a node capacitor of the touch panel, wherein the sensor includes a first amplifier including a first input terminal, a second input terminal, and an output terminal, the first input terminal being connected to the corresponding sensing line, a feedback capacitor connected between the output terminal and the first input terminal of the first amplifier, and an inverting amplifier for invert-amplifying an output signal of the output terminal of the first amplifier and supplying the invert-amplified output signal to the second input terminal of the first amplifier.

20 Claims, 3 Drawing Sheets

TOUCH SENSOR AND TOUCH SENSITIVE DISPLAY INCLUDING THE SAME

CROSS-REFERENCE TO RELATED APPLICATIONS

This application claims the benefit of Korean Patent Application No. 10-2014-0025225, filed on Mar. 3, 2014, which is hereby incorporated by reference in its entirety as if fully set forth herein.

BACKGROUND OF THE INVENTION

1. Field of the Invention

The present invention relates to a capacitive touch panel, and, more particularly, to methods, systems, and apparatuses for providing reduced waveform distortion for a touch panel sensor.

2. Discussion of the Related Art

Input from a touch sensor may include a driving signal input through a capacitor positioned between a sensing electrode and a driving electrode of a touch panel, and a noise signal input through a capacitor positioned between a sensing node of the touch panel and an object (e.g., a finger) touching the touch panel. A sensed signal from the touch sensor may be obtained by mixing the driving signal input and the noise signal input.

The sensed signal may be distorted by interference from external sources. For example, radiation may be caused by a fluorescent light or charging device in proximity to the touch sensor. In some cases, this interference may be sufficient to cause an amplifier (e.g., an operating amplifier) of an analog signal sensor of the touch sensor to operate outside of its normal operating range. Accordingly, this may result in the distortion of the output of the analog signal sensor of the touch sensor, which may in turn interfere with providing touch information from the touch sensor.

Capacitance of a feedback capacitor of an analog sensor may be increased or a high-order analog filter may be used in order to prevent an output signal of an amplifier of the analog sensor from being outside the normal operating range. However, these modifications typically result in an increased circuit area and additional power consumption.

SUMMARY OF THE INVENTION

Accordingly, the present invention is directed to a touch sensor that substantially obviates one or more problems due to limitations and disadvantages of the related art.

An object of the present invention is to provide a touch sensor including a sensing circuit that can reduce the size of a feedback capacitor without reduction in the performance of a sensing circuit so as to occupy a small area.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a touch sensor includes a touch panel including driving lines, sensing lines, and a node capacitor formed between a driving line and a sensing line adjacent to each other, a driver for supplying a driving signal to each of the driving lines, and a sensor electrically connected to the sensing lines, for detecting capacitance of a node capacitor between a driving line with the driving signal supplied thereto and a sensing line corresponding to the driving line, wherein the sensor includes a first amplifier including a first input terminal, a second input terminal, and an output terminal, the first input terminal being connected to the corresponding sensing line, a feedback capacitor connected between the output terminal and the first input terminal of the first amplifier, and an inverting amplifier for invert-amplifying an output signal of the output terminal of the first amplifier and supplying the invert-amplified output signal to the second input terminal of the first amplifier.

The inverting amplifier may include a second amplifier including a first input terminal, a second input terminal, and an output terminal, a first resistor connected between the output terminal of the first amplifier and the first input terminal of the second amplifier, and a second resistor connected between the first input terminal of the second amplifier and the output terminal of the second amplifier.

The touch sensor may further include a feedback resistor connected between the output terminal and the first input terminal of the first amplifier and connected in parallel to the feedback capacitor.

The first amplifier may be an operating amplifier.

The second input terminal may be electrically connected to a ground source.

The first resistor and the second resistor may have the same resistance.

The second amplifier may be an operating amplifier.

In another aspect of the present invention, a touch sensor includes a touch panel including driving lines, sensing lines, and a node capacitor formed between a driving line and a sensing line adjacent to each other, a driver for supplying a driving signal to each of the driving lines, and a sensor electrically connected to the sensing lines, for detecting capacitance of the node capacitor. The sensor includes sensing circuits, each of which senses a signal received from corresponding one of the sensing lines. Each of the sensing circuits includes a first amplifier including a first input terminal, a second input terminal, and an output terminal. The first input terminal is connected to the corresponding sensing line, a feedback capacitor connected between the output terminal and the first input terminal of the first amplifier. Each of the sensing circuits also includes a feedback resistor connected between the output terminal and the first input terminal of the first amplifier and connected in parallel to the feedback capacitor, and an inverting amplifier for invert-amplifying an output signal of the output terminal of the first amplifier and supplying the invert-amplified output signal to the second input terminal of the first amplifier.

The sensor may further include analog-digital converters, and each of the analog-digital converters may convert output of corresponding one of the sensing circuits into a digital signal.

The inverting amplifier may include a second amplifier including a first input terminal, a second input terminal, and an output terminal, a first resistor connected between the output terminal of the first amplifier and the first input terminal of the second amplifier, and a second resistor connected between the first input terminal of the second amplifier and the output terminal of the second amplifier, wherein the second input terminal of the second amplifier may be electrically connected to a ground source.

The first amplifier and the second amplifier may each be an operating amplifier.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
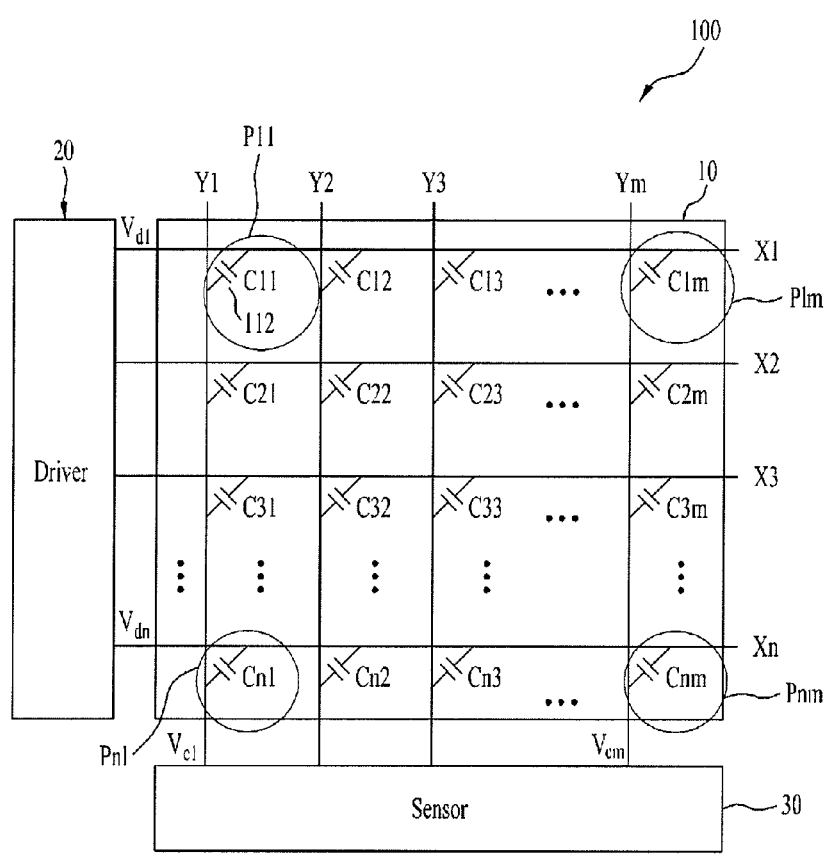
FIG. 1 is a block diagram of a touch sensor according to an embodiment of the present invention.

Reference will now be made in detail to embodiments of the present invention, examples of which are illustrated in the accompanying drawings. In description of elements, it will be understood that when an element or layer is referred to as being "on" or "under" another element or layer, the element or layer can be directly on another element or layer or intervening elements or layers, and criteria for "on" and "under" will be provided based on the drawings.

Elements in the following drawings may be exaggerated, omitted, or schematically illustrated for conveniences and clarity of explanation, and the sizes of elements do not reflect their actual sizes completely. In addition, the same reference numerals in the drawings denote the same elements.

FIG. 1 is a block diagram of an example of a touch sensor 100 according to an embodiment of the present invention.

Referring to FIG. 1, the touch sensor 100 includes a touch panel 10, a driver 20, and a sensor 30.

The touch panel 10 performs a substantial independent function and provides a plurality of sensing nodes P11 to Pnm present at different locations, where n and m are each a natural number greater than 1.

The sensing nodes P11 to Pnm may be interchangeably used with coordinates, sensing points, nodes, a sensing node array, or the like.

For example, the touch panel 10 may include a plurality of driving lines X1 to Xn, a plurality of sensing lines Y1 to Ym, and node capacitors C11 to Cnm formed between a driving line and a sensing line which are adjacent to each other.

The driving lines X1 to Xn may be interchangeably used with driving signal lines, driving electrodes, or the like.

In addition, the sensing lines Y1 to Ym may be interchangeably used with sensing signal lines, sensing electrodes, or the like.

In FIG. 1, driving lines and sensing lines cross each other. However, embodiments of the present invention are not limited thereto. That is, the driving lines and the sensing lines may be embodied as parallel lines, partially overlapping lines, or in any other configuration.

Any one sensing node (e.g., P11) may be defined by any one node capacitor (e.g., C11) formed between any one driving line (e.g., X1) and any one sensing line (e.g., Y1) adjacent thereto.

For example, a driving line Xi, wherein i is a natural number satisfying $0 < i \leq n$, and a sensing line Yj, where j is a natural number satisfying $0 < j \leq m$, may be insulated and separated from each other. A node capacitor Cij may be formed between the driving line Xi and the sensing line Yj.

For example, the touch panel 10 may include an electrode pattern layer (not shown) including a sensing electrode and a driving electrode that are spaced apart from each other, a substrate (not shown) disposed in front of the electrode pattern layer, and an insulating layer (not shown) disposed behind the electrode pattern layer. A layout of the electrode pattern layer may have various shapes according to a design method.

The electrode pattern layer may be formed of at least one among transmissive conductive materials, for example, indium tin oxide (ITO), tin oxide (TO), indium zinc oxide (IZO), indium tin zinc oxide (ITZO), indium aluminum zinc oxide (IAZO), indium gallium zinc oxide (IGZO), indium gallium tin oxide (IGTO), aluminum zinc oxide (AZO), antimony tin oxide (ATO), gallium zinc oxide (GZO), carbon nanotube (CNT), conductive polymer, silver (Ag) or copper (Cu) transparent ink.

The electrode pattern layer may be formed on one or more layers formed of glass or plastic via coating to form a sensing node array P11 to Pnm as described above.

The substrate may be formed in the form of a dielectric film with high light transmittance and may include at least one of, for example, glass, polyethylene terephthalate (PET), polyethylene naphthalate (PEN), polyimide (PI), and acryl.

The insulating layer may be a transmissive insulating layer such as a PET layer, or the like. According to another embodiment of the present invention, a shielding layer (not shown) may be disposed below the insulating layer in order to remove electromagnetic interference (EMI) and noise introduced into the electrode pattern layer.

The touch panel 10 may be merged with a layer for display and the touch panel 10 and the layer may share a path for driving or sensing according to an appropriate panel design method. Alternately, the touch panel may function independently of a display, and may instead include a 2D sensing node array that operates without a display layer. It should be appreciated that embodiments may be utilized in conjunction with any touch sensing system including a 2D sensing node array.

The driver 20 may be electrically connected to the plural driving lines X1 to Xn and may supply driving signals to the driving lines X1 to Xn.

The driver 20 may supply a driving signal to at least one of the plural driving lines X1 to Xn.

For example, the driver 20 may sequentially supply driving signals to the plural driving lines X1 to Xn or may simultaneously supply driving signals to two or more driving lines.

Here, the term "simultaneously" may refer to precisely simultaneous cases as well as almost simultaneous cases.

For example, the simultaneous cases may refer to cases that begin and end almost, but not precisely, concurrently and/or cases in which time periods at least partially overlap each other.

The sensor 30 may be electrically connected to the plural sensing lines Y1 to Ym and may detect capacitance of a node capacitor between a driving line with a driving signal supplied thereto and a sensing line corresponding to the driving line.

Figure 2:
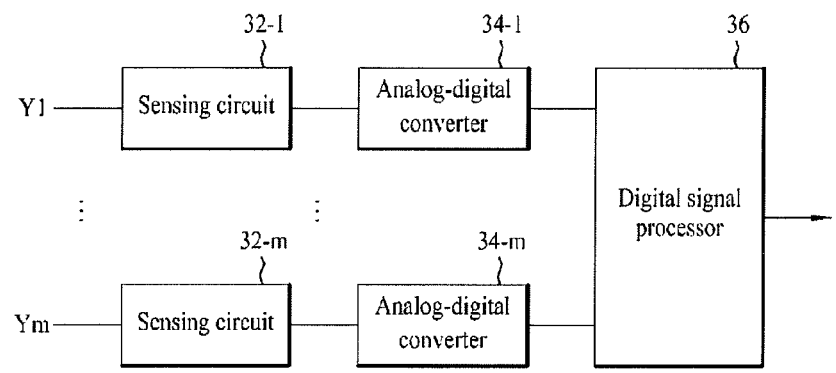
FIG. 2 is a block diagram illustrating a sensor illustrated in FIG. 1 according to an embodiment of the present invention.
Figure 3:
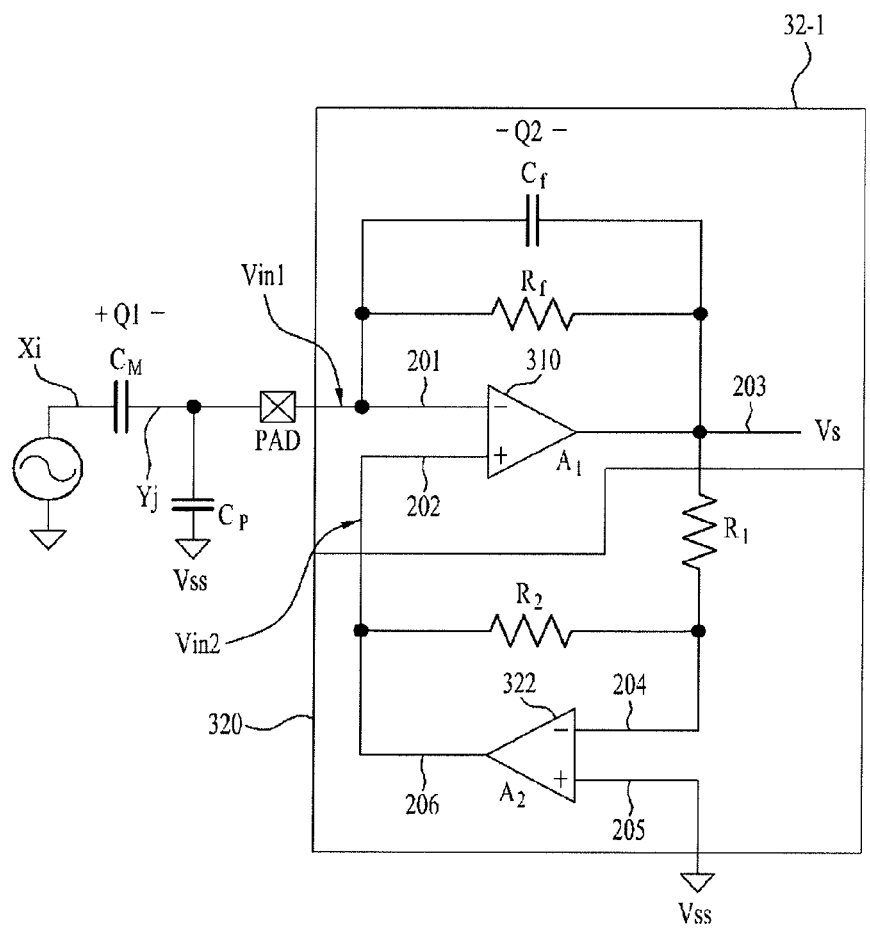
FIG. 3 is a diagram illustrating a structure of a first sensing circuit illustrated in FIG. 2.

FIG. 2 is a block diagram illustrating an example embodiment of the sensor 30 illustrated in FIG. 1 according to an embodiment of the present invention. FIG. 3 is a diagram illustrating an example of a structure of a first sensing circuit 32-1 illustrated in FIG. 2.

Referring to FIGS. 2 and 3, the sensor 30 may include sensing circuits 32-1 to 32-m, where m is a natural number greater than 1, analog-digital converters 34-1 to 34-m, and a digital signal processor 36.

Each of the sensing circuits 32-1 to 32-m may be connected to corresponding one of the plural sensing lines Y1 to Ym and may sense a signal received through corresponding one of sensing lines.

Each of the sensing circuits 32-1 to 32-m may include a first amplifier 310, a feedback resistor Rf, a feedback capacitor Cf, and an inverting amplifier 320.

The first amplifier 310 may include a first input terminal 201 (e.g., an inverting terminal) connected to corresponding one of sensing lines Yj, a second input terminal 202 (e.g., a non-inverting terminal), and an output terminal 203 for outputting a sensing signal Vs.

The first amplifier 310 may be a differential amplifier for differentially amplifying a first signal Vin1 input to the first input terminal 201 and a second signal Vin2 input to the second input terminal 202. In FIG. 3, the first amplifier 310 is exemplified as an operating amplifier embodied as a field effect transistor (FET) or a bipolar junction transistor (BJT), but is not limited thereto.

The feedback resistor Rf may be electrically connected between the output terminal 203 and the first input terminal 201 of the first amplifier 310, and the feedback capacitor Cf may be electrically connected between the output terminal 203 and the first input terminal 201 of the first amplifier 310.

For example, the feedback resistor Rf and the feedback capacitor Cf may be connected in parallel to each other between the output terminal 203 and the first input terminal 201 of the first amplifier 310.

The feedback resistor Rf and the feedback capacitor Cf may cause negative feedback of an output signal Vs of the first amplifier 310 to the first input terminal 201.

The inverting amplifier 320 invert-amplifies the output signal Vs of the output terminal 203 of the first amplifier 310 and supplies the invert-amplified output signals −a×Vs (a>0) to the second input terminal 202 of the first amplifier 310. Here, is an amplifying ratio (Vin2/Vs). Thus, the second signal Vin2 input to the second input terminal 202 by the inverting amplifier 320 may be −a×Vs.

For example, the inverting amplifier 320 may include a second amplifier 322, a first resistor R1, and a second resistor R2.

The second amplifier 322 may include a first input terminal 204 (e.g., an inverting terminal), a second input terminal 205 (e.g., a non-inverting terminal), and an output terminal 206. The second amplifier 322 may be, but is not limited to, an operating amplifier.

The first resistor R1 is connected between the output terminal 203 of the first amplifier 310 and the first input terminal 204 of the second amplifier 322. For example, one end of the first resistor R1 may be connected to the output terminal 203 of the first amplifier 310, and the other end of the first resistor R1 may be connected to the first input terminal 204 of the second amplifier 322.

The second resistor R2 is connected between the first input terminal 204 of the second amplifier 322 and the output terminal 206 of the second amplifier 322. For example, one end of the second resistor R2 may be the first input terminal 204 of the second amplifier 322 and the other end of the first resistor R1, and the other end of the second resistor R2 may be connected to the output terminal 206 of the second amplifier 322 and the second input terminal 202 of the first amplifier 310.

The second input terminal 205 of the second amplifier 322 is connected to a ground source Vss, such as an analog ground source.

An amplification ratio 'a' of the inverting amplifier 320 may be a ratio R2/R1 of the first resistor R1 and the second resistor R2.

When resistance of the first resistor R1 is sufficiently greater than output impedance of the first amplifier 310, resistance of the second resistor R2 is sufficiently greater than output impedance of the second amplifier 322, and the first resistor R1 and the second resistor R2 have the same resistance so as to remove loading effect, the second signal Vin2 input to the second input terminal 202 of the first amplifier 310 may have the same absolute value and an opposite sign (−Vs) of output Vs of the first amplifier 310.

When resistance of the first resistor R1 is sufficiently greater than output impedance of the first amplifier 310, resistance of the second resistor R2 is sufficiently greater than output impedance of the second amplifier 322, and the first resistor R1 and the second resistor R2 have the same resistance so as to remove loading effect, the output signal Vs of the output terminal 203 of the first amplifier 310 may be obtained in a passband according to Equation 1 below.

$$Vs = \frac{Cm}{2Cf + Cp + Cm} \times Vd \qquad (1)$$

Here, Cm may refer to capacitance between the sensing line Yj and the driving line Xi corresponding thereto, Cp refers to parasitic capacitance of the first input terminal 201 and the sensing line Yj except for Cm, and Vd refers to a driving signal input to the driving line Xi corresponding to the sensing line Yj.

In FIG. 3, when an inverting amplifier 230 is removed and the second input terminal 202 of a first amplifier 210 is connected to an analog ground source Vss, an output signal Vs1 of the first amplifier 310 may be obtained in a passband according to Equation 2 below.

$$Vs1 = \frac{Cm}{Cf} \times Vd \qquad (2)$$

In general, when serious noise is introduced to a touch sensor, an output waveform of an amplifier of a sensing circuit is distorted, causing output of the amplifier to be outside a normal operating range. In such cases, it may be impossible to receive touch information from the touch sensor in a normal, consistent manner.

Figure 4:
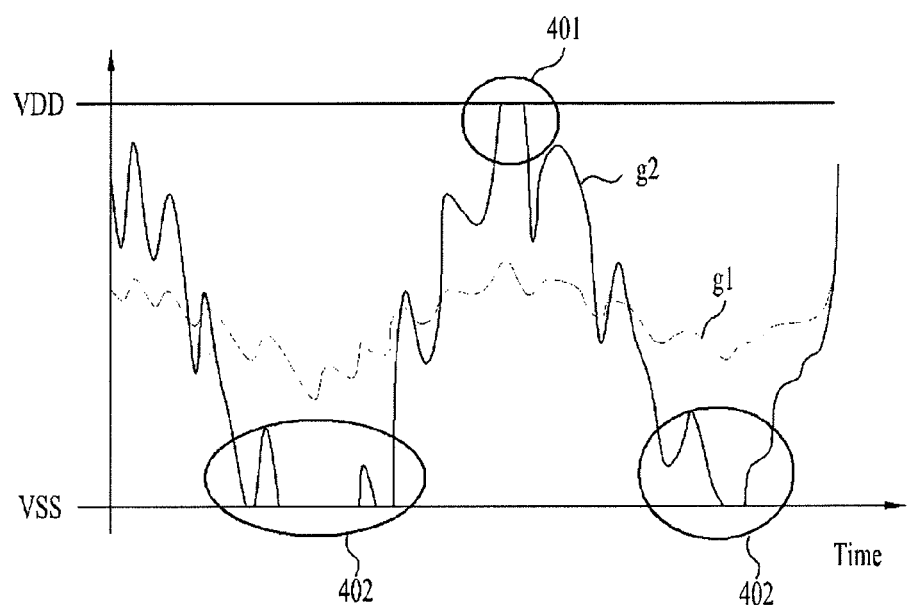
FIG. 4 illustrates distortion of output of an amplifier according to noise.

FIG. 4 illustrates an example of distortion of output of an amplifier caused by to noise.

Referring to FIG. 4, g1 refers to output of the amplifier when noise is prevented by a large size feedback capacitor, and g2 refers to output of the amplifier when noise is not prevented by a small size feedback capacitor.

With regard to g1, the output of the amplifier is within a normal operating range defined between VSS to VDD, whereas with regard to g2, the output of the amplifier exceeds the normal operating range, thereby causing signal distortions 401 and 402.

The size of the feedback capacitor of the sensing circuit may be increased so as to prevent the output of the amplifier from being outside the normal operating range due to noise. However, problems may arise as a result of the need for increased circuit area to accommodate the larger feedback capacitor.

According to embodiments of the present invention, the use of the inverting amplifier 320 may double a quantity of electric charge that can be stored in the feedback capacitor Cf, thus reducing the need for a larger feedback capacitor.

According to embodiments of the present invention, a sensing circuit (e.g., 32-1) may maintain the same performance even if the capacitance of the feedback capacitor Cf is reduced to ½ or less. In the context of the present example, the term "same performance" refers to the ability of the sensing circuit to remain within the normal operation range due to noise (e.g., the feedback capacitor may maintain the same noise reduction qualities even with a 50% or more reduction in capacitance).

Feedback capacitors may typically occupy a large ratio of the overall area of a sensing circuit. For example, some feedback capacitors occupy 72% or more of the overall area of a sensing circuit.

According to an embodiment of the present invention, by virtue of the inverting amplifier 320, the size of the feedback capacitor Cf can be reduced ½ or smaller without reduction in the performance of a sensing circuit (e.g., 32-1). By reducing the size of the feedback capacitor, the overall size of the sensing circuit may therefore be reduced.

According to Equation 1 above, the first resistor R1 and the second resistor R2 are the same. However, a ratio R2/R1 of the first resistor R1 and the second resistor R2 may be reduced so as to adjust an amount of output Vd of a sensing circuit (e.g., 32-1).

For example, when the ratio R2/R1 of the first resistor R1 and the second resistor R2 is greater than 1 (R2/R1>1), the output Vd of the sensing circuit (e.g., 32-1) may be reduced. Conversely, where the ratio R2/R1 is greater than 1, the output Vd of the sensing circuit may be increased.

According to an embodiment of the present invention, the ratio R2/R1 of the first resistor R1 and the second resistor R2 may be adjusted so as to further reduce the size of the feedback capacitor Cf without reduction in the performance of the sensing circuit (e.g., 32-1) compared with a case in which the ratio of the first resistor R1 and the second resistor R2 is 1.

However, for normal operation of the first amplifier 310, the ratio R2/R1 of the first resistor R1 and the second resistor R2 may need to be adjusted so as to prevent an inverting amplification signal supplied to the second input terminal 202 of the first inverting amplifier 310 by the inverting amplifier 320 from being outside a permitted input range of the first inverting amplifier 310.

For example, the output Vd of the first sensing circuit 32-1 may be −6 dBFS (decibels full scale) or smaller according to an input range of an analog-digital converter 34, and a permitted input range of the first amplifier 310 may be −6 dBFS or greater. Thus, according to an embodiment of the present invention, the ratio R2/R1 of the first resistor R1 and the second resistor R2 may be adjusted so as to further adjust amplification of a voltage of the first sensing circuit 32-1 to conform with the input range of the analog-digital converter 34.

Each of the analog-digital converter 34-1 to 34-m, where m is a natural number greater than 1, converts the output Vd of corresponding one of the sensing circuits 32-1 to 32-m into a digital signal.

For example, an analog-digital converter (e.g., 34-1) may generate a digital signal corresponding to the output Vd of a sensing circuit (e.g., 32-1).

The digital signal processor 36 may detects capacitor variation in the sensing nodes (e.g., P11 to Pnm as described above with respect to FIG. 1) based on the digital signal output from the analog-digital converter 34-1 to 34-m.

As described above, according to an embodiment of the present invention, the size of the feedback capacitor Cf can be reduced to ½ or smaller without reduction in performance of the sensing circuit (e.g., 32-1), and thus, a touch sensor including a sensing circuit that occupies a small area can be embodied.

According to the embodiments of the present invention, the size of a feedback capacitor may be reduced without reduction in the performance of a sensing circuit so as to reduce an area occupied by the sensing circuit.

It will be apparent to those skilled in the art that various modifications and variations can be made in the present invention without departing from the spirit or scope of the inventions. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A touch sensor comprising:
a touch panel comprising driving lines, sensing lines, and a node capacitor formed between a driving line and a sensing line adjacent to each other;
a driver for supplying a driving signal to each of the driving lines; and a sensor electrically connected to the sensing lines, for detecting capacitance of a node capacitor between a driving line with the driving signal supplied thereto and a sensing line corresponding to the driving line,
wherein the sensor comprises:
a first amplifier comprising a first input terminal, a second input terminal, and an output terminal, the first input terminal being connected to the corresponding sensing line;
a feedback capacitor connected between the output terminal and the first input terminal of the first amplifier; and
an inverting amplifier for invert-amplifying an output signal of the output terminal of the first amplifier and supplying the invert-amplified output signal to the second input terminal of the first amplifier,
wherein the inverting amplifier includes:
a second amplifier including a first input terminal, a second input terminal, and an output terminal directly connected to the second input terminal of the first amplifier;
a first resistor connected between the output terminal of the first amplifier and the first input terminal of the second amplifier; and a second resistor connected between the first input terminal of the second amplifier and the output terminal of the second amplifier.

2. The touch sensor according to claim 1, wherein an amplification ratio of the inverting amplifier is a ratio of a resistance of the first resistor and a resistance of the second resistor.

3. The touch sensor according to claim 2, wherein the second input terminal of the second amplifier is electrically connected to a ground source.

4. The touch sensor according to claim 2, wherein the first resistor and the second resistor have the same resistance.

5. The touch sensor according to claim 2, wherein the second amplifier is an operating amplifier.

6. The touch sensor according to claim 1, further comprising a feedback resistor connected between the output terminal and the first input terminal of the first amplifier and connected in parallel to the feedback capacitor.

7. The touch sensor according to claim 1, wherein the first amplifier is an operating amplifier.

8. The touch sensor according to claim 1, wherein each of the first input terminals of the first and second amplifiers is an inverting terminal and each of the second input terminals of the first and second amplifiers is a non-inverting terminal.

9. The touch sensor according to claim 1, wherein one end of the second resistor is connected to a first node connecting the output terminal of the first amplifier and the first input terminal of the second amplifier, and the other end of the second resistor is connected to a second node connecting the output terminal of the second amplifier and the second input terminal of the first amplifier.

10. A touch sensor comprising:
a touch panel comprising driving lines, sensing lines, and a node capacitor formed between a driving line and a sensing line adjacent to each other;
a driver for supplying a driving signal to each of the driving lines; and
a sensor electrically connected to the sensing lines, for detecting capacitance of the node capacitor,
wherein the sensor comprises sensing circuits, each of which senses a signal received from corresponding one of the sensing lines,
wherein each of the sensing circuits comprises:
a first amplifier comprising a first input terminal connected to the sensing line, a second input terminal, and an output terminal, the first input terminal being connected to the corresponding sensing line;
a feedback capacitor connected between the output terminal and the first input terminal of the first amplifier;
a feedback resistor connected between the output terminal and the first input terminal of the first amplifier and connected in parallel to the feedback capacitor; and
an inverting amplifier for invert-amplifying an output signal of the output terminal of the first amplifier and supplying the invert-amplified output signal to the second input terminal of the first amplifier,
wherein the inverting amplifier includes:
a second amplifier including a first input terminal, a second input terminal connected to a ground source, and an output terminal directly connected to the second input terminal of the first amplifier;
a first resistor connected between the output terminal of the first amplifier and the first input terminal of the second amplifier; and
a second resistor connected between the first input terminal of the second amplifier and the output terminal of the second amplifier.

11. The touch sensor according to claim 10, wherein:
the sensor further comprises analog-digital converters; and
each of the analog-digital converters converts output of corresponding one of the sensing circuits into a digital signal.

12. The touch sensor according to claim 10, wherein an amplification ratio of the inverting amplifier is a ration of a resistance of the first resistor and a resistance of the second resistor.

13. The touch sensor according to claim 12, wherein the first amplifier and the second amplifier are each an operating amplifier.

14. A touch sensitive display comprising:
a display coupled to a touch panel;
the touch panel, comprising driving lines, sensing lines, and a node capacitor formed between a driving line and a sensing line adjacent to each other;
a driver for supplying a driving signal to each of the driving lines; and a sensor electrically connected to the sensing lines, for detecting capacitance of a node capacitor between a driving line with the driving signal supplied thereto and a sensing line corresponding to the driving line,
a sensor electrically connected to the sensing lines, for detecting capacitance of the node capacitor between a driving line with the driving signal supplied thereto and a sensing line corresponding to the driving line,
wherein the sensor comprises:
a first amplifier comprising a first input terminal connected to the sensing line, a second input terminal, and an output terminal, the first input terminal being connected to the corresponding sensing line;
a feedback capacitor connected between the output terminal and the first input terminal of the first amplifier; and
an inverting amplifier for invert-amplifying an output signal of the output terminal of the first amplifier and supplying the invert-amplified output signal to the second input terminal of the first amplifier,
wherein the inverting amplifier comprises:
a second amplifier including a first input terminal, a second input terminal, and an output terminal directly connected to the second input terminal of the first amplifier;
a first resistor connected between the output terminal of the first amplifier and the first input terminal of the second amplifier; and
a second resistor connected between the first input terminal of the second amplifier and the output terminal of the second amplifier.

15. The touch sensitive display according to claim 14, wherein the inverting amplifier comprises:
a second amplifier comprising a first input terminal, a second input terminal, and an output terminal;
a first resistor connected between the output terminal of the first amplifier and the first input terminal of the second amplifier; and
a second resistor connected between the first input terminal of the second amplifier and the output terminal of the second amplifier.

16. The touch sensitive display according to claim 15, wherein the first resistor and the second resistor have the same resistance.

17. The touch sensitive display according to claim 15, wherein the second amplifier is an operating amplifier.

18. The touch sensitive display according to claim 14, further comprising a feedback resistor connected between the output terminal and the first input terminal of the first amplifier and connected in parallel to the feedback capacitor.

19. The touch sensitive display according to claim 14, wherein the first amplifier is an operating amplifier.

20. The touch sensitive display according to claim 14, wherein the second input terminal is electrically connected to a ground source.

\* \* \* \* \*